United States Patent
McCormick (10) Patent No.: US 11,933,160 B1
(45) Date of Patent: Mar. 19, 2024

(54) SENSOR TRANSPORTATION DEVICE

(71) Applicant: PETROMAC IP LIMITED, Auckland (NZ)

(72) Inventor: Stephen Peter McCormick, Auckland (NZ)

(73) Assignee: PETROMAC IP LIMITED, Auckland (NZ)

( * ) Notice: Subject to any disclaimer, the term of this patent is extended or adjusted under 35 U.S.C. 154(b) by 17 days.

(21) Appl. No.: 18/300,752

(22) Filed: Apr. 14, 2023

(51) Int. Cl.
*E21B 47/01* (2012.01)
*B33Y 80/00* (2015.01)

(52) U.S. Cl.
CPC .............. *E21B 47/01* (2013.01); *B33Y 80/00* (2014.12)

(58) Field of Classification Search
CPC ........ E21B 47/01; E21B 47/024; E21B 17/10; E21B 23/14; E21B 17/1057; E21B 23/001; B33Y 80/00
See application file for complete search history.

(56) References Cited

U.S. PATENT DOCUMENTS

| 9,863,198 | B2 | 1/2018 | McCormick | |
|---|---|---|---|---|
| 2003/0075321 | A1 | 4/2003 | Hall | |
| 2005/0252655 | A1* | 11/2005 | McKay | E21B 17/1057 166/241.3 |
| 2011/0017334 | A1* | 1/2011 | Peter | B21C 23/085 72/368 |
| 2020/0308953 | A1* | 10/2020 | McCormick | E21B 23/14 |
| 2020/0308955 | A1* | 10/2020 | Hird | E21B 47/013 |

FOREIGN PATENT DOCUMENTS

WO    WO-2022232481 A1 * 11/2022 ............. A61K 31/12

* cited by examiner

*Primary Examiner* — Caroline N Butcher
(74) *Attorney, Agent, or Firm* — Dann, Dorfman, Herrell and Skillman, P.C.

(57) ABSTRACT

A device for transporting a sensor assembly along a bore comprises an axle extending through a body of the device and mounted to rotate on a rotational axis perpendicular to a central longitudinal axis of the device. A wheel fixed to each end of the axle. The device has a conduit through the body for accommodating an electrical conductor to extend through the device from end-to-end. The conduit comprises a non-linear portion extending around the axle between the ends of the device.

17 Claims, 7 Drawing Sheets

SECTION B-B
FIGURE 2G
(Prior art)

SENSOR TRANSPORTATION DEVICE

TECHNICAL FIELD

This invention relates to devices for use in transporting (conveying) a sensor assembly along a bore such as a pipe, a wellbore or a cased wellbore, and in particular to devices for use in transporting sensor tool strings in cased wellbores in wireline logging operations.

BACKGROUND

Hydrocarbon exploration and development activities rely on information derived from sensors which capture data relating to the geological properties of an area under exploration. One approach used to acquire this data is through wireline logging. Wireline logging is performed in a wellbore immediately after a new section of hole has been drilled, referred to as open-hole logging. These wellbores are drilled to a target depth covering a zone of interest, typically between 1000-5000 meters deep. A sensor package, also known as a "logging tool" or "tool-string" is then lowered into the wellbore and descends under gravity to the target depth of the wellbore well. The logging tool is lowered on a wireline—being a collection of electrical communication wires which are sheathed in a steel cable connected to the logging tool. The steel cable carries the loads from the tool-string, the cable itself, friction forces acting on the downhole equipment and any overpulls created by sticking or jamming. Once the logging tool reaches the target depth it is then drawn back up through the wellbore at a controlled rate of ascent, with the sensors in the logging tool operating to generate and capture geological data.

Wireline logging is also performed in wellbores that are lined with steel pipe or casing, referred to as cased-hole logging. After a section of wellbore is drilled, casing is lowered into the wellbore and cemented in place. The cement is placed in the annulus between the casing and the wellbore wall to ensure isolation between layers of permeable rock layers intersected by the wellbore at various depths. The cement also prevents the flow of hydrocarbons in the annulus between the casing and the wellbore which is important for well integrity and safety. Wireline logging is performed in case hole to measure the integrity of the cement bond (Cement Bond Logging). There is a wide range of logging tools which are designed to measure various physical properties of the rocks and fluids contained within the rocks.

The logging tools include transducers and sensors to measure properties such as electrical resistance, gamma-ray density, speed of sound and so forth. The individual logging tools are combinable and are typically connected together to form a logging tool-string. A wireline logging tool-string is typically in the order of 20 ft to 100 ft long and 2" to 5" in diameter.

In open hole (uncased wellbores), logging tools are used to scan the wellbore wall to determine the formation structural dip, the size and orientation of fractures, the size and distribution of pore spaces in the rock and information about depositional environment. In cased hole, logging tools are used to assess the strength of the cement bond between the casing and the wellbore wall and the condition of the casing. Logging tools are also run in producing wells to determine flow characteristics of produced fluids.

The drilling of wells and the wireline logging operation is an expensive undertaking. This is primarily due to the capital costs of the drilling equipment and the specialised nature of the wireline logging systems. It is important for these activities to be undertaken and completed as promptly as possible to minimise these costs. Delays in deploying a wireline logging tool are to be avoided wherever possible.

One cause of such delays is the difficulties in lowering wireline logging tools down to the target depth of the wellbore. The logging tool is lowered by the wireline cable down the wellbore under the force of gravity alone. The cable, being flexible, cannot push the tool down the wellbore. Hence the operator at the top of the well has very little control of the descent of the logging tool.

The chances of a wireline logging tools failing to descend is significantly increased with deviated wells. Deviated wells do not run vertically downwards and instead extend downward and laterally at an angle from vertical. Multiple deviated wells are usually drilled from a single surface location to allow a large area to be explored and produced. As wireline logging tools are run down a wellbore with a cable under the action of gravity, the tool-string will drag along the low side or bottom of the wellbore wall as it travels downwards to the target depth. The friction or drag of the tool-string against the wellbore wall can prevent to tool descending to the desired depth. The long length of a tool string can further exacerbate problems with navigating the tool string down wellbore.

Figure 1:
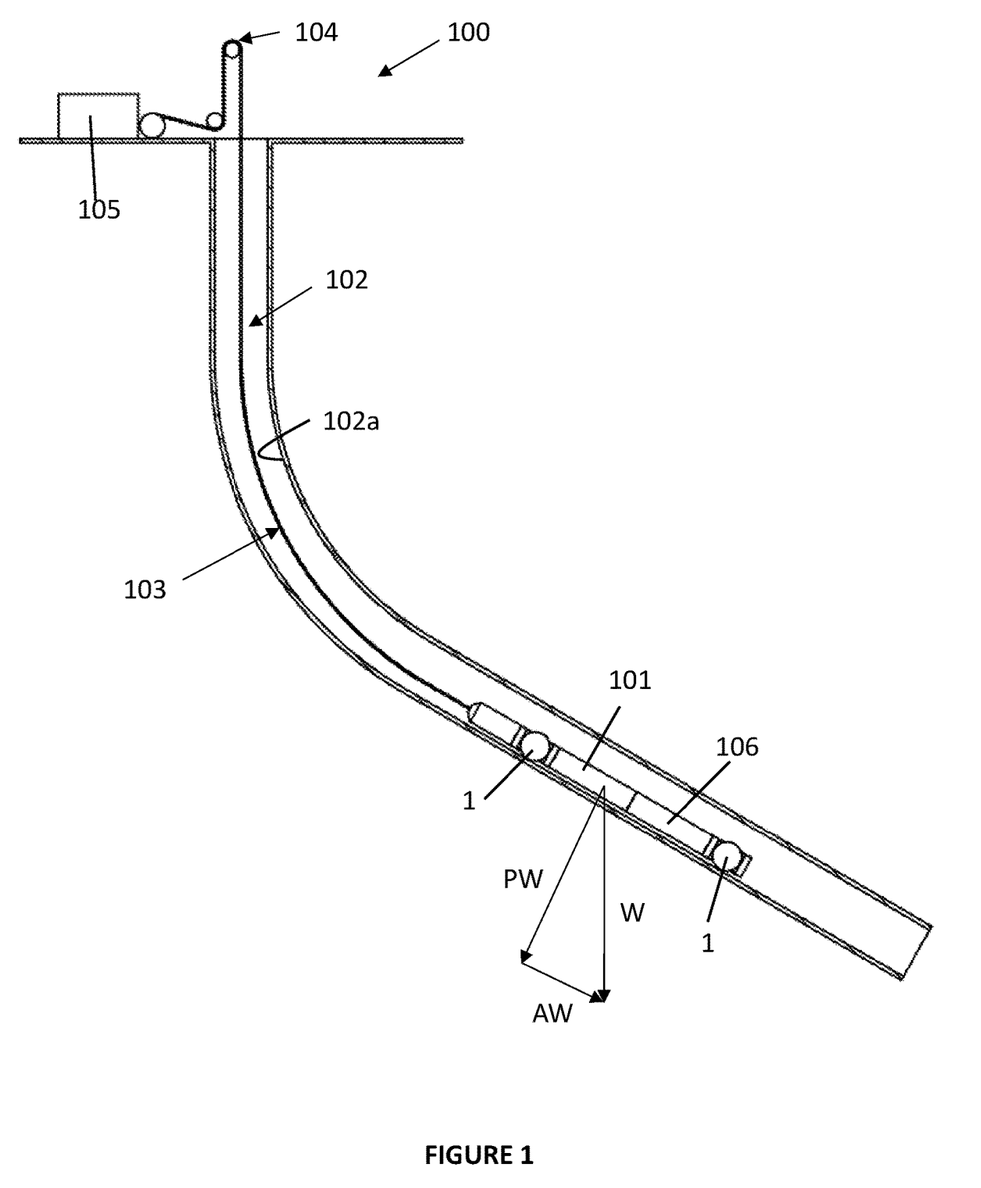
FIG. 1 is a schematic representation of a well site and a tool string descending a wellbore in a wireline logging operation.

With reference to FIG. 1, in deviated wells the weight of the tool-string exerts a lateral force (PW) perpendicular to the wellbore wall. This lateral force results in a drag force which acts to prevent the tool-string descending the wellbore. The axial component of tool-string weight (AW) acts to pull the tool-string down the wellbore and this force is opposed by the drag force which acts in the opposing direction. As the well deviation increases the axial component of tool weight (AW) reduces and the lateral force (PW) increases. When the drag resulting from the lateral force (PW) equals the axial component (AW) of tool-string weight the tool will not descend in the wellbore.

As hole deviation increases, the sliding friction or drag force can prevent the logging tool descending. The practical limit is 60° from the vertical, and in these high angle wells any device that can reduce friction is very valuable. The drag force is the product of the lateral component of tool weight acting perpendicular to the wellbore wall and the coefficient of friction. It is desirable to reduce the coefficient of friction to reduce the drag force. The coefficient of friction may be reduced by utilising low friction materials, such as Teflon. The drag force may also be reduced by using wheels mounted to the tool-string.

Figures 2A, 2B:
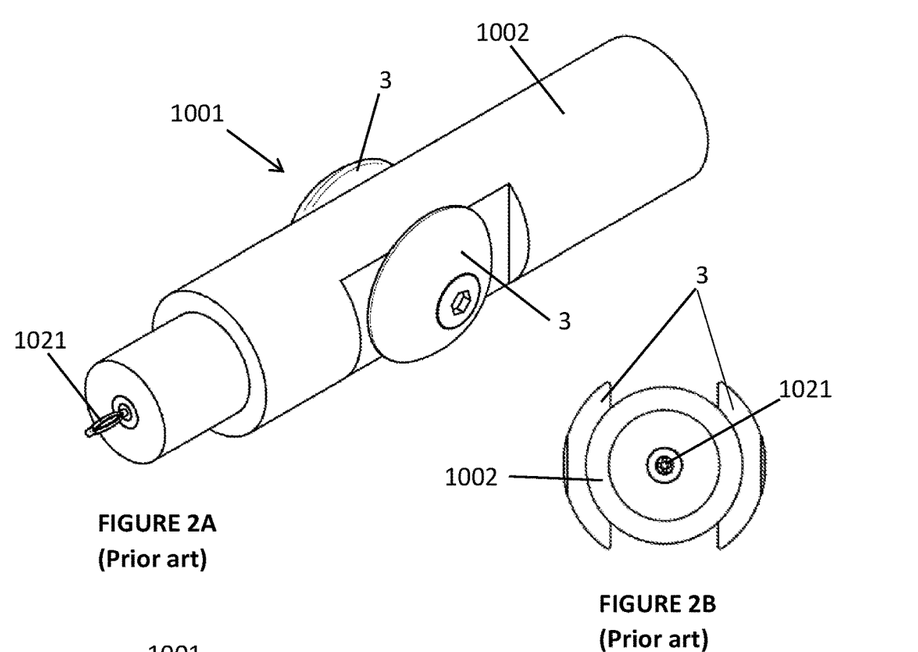
FIG. 2A is an isometric view of the device.
FIG. 2B is an end view of the device.
Figure 2C:
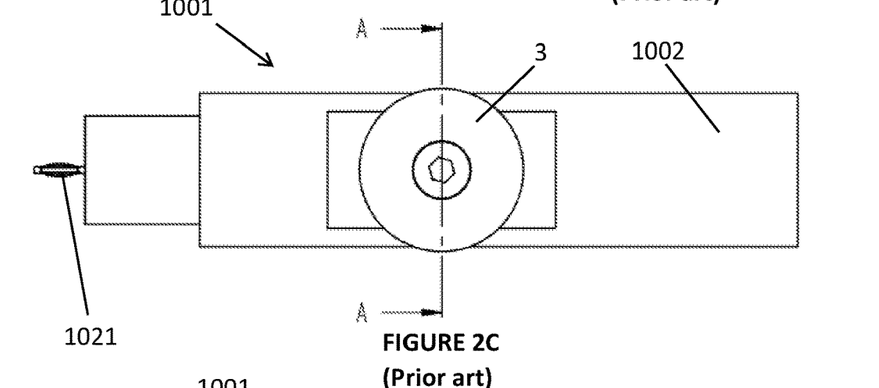
FIG. 2C is a side view of the device.
Figure 2D:
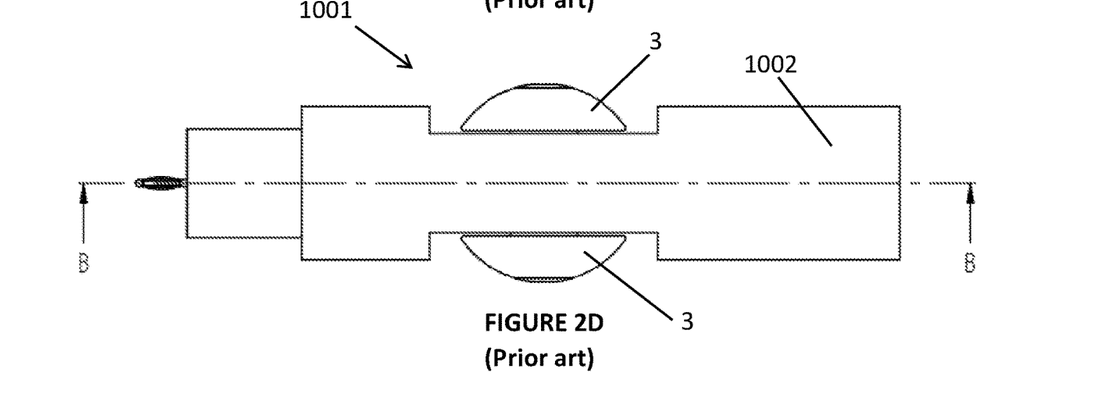
FIG. 2D is another side view orthogonal to FIG. 2C.
Figure 2E:
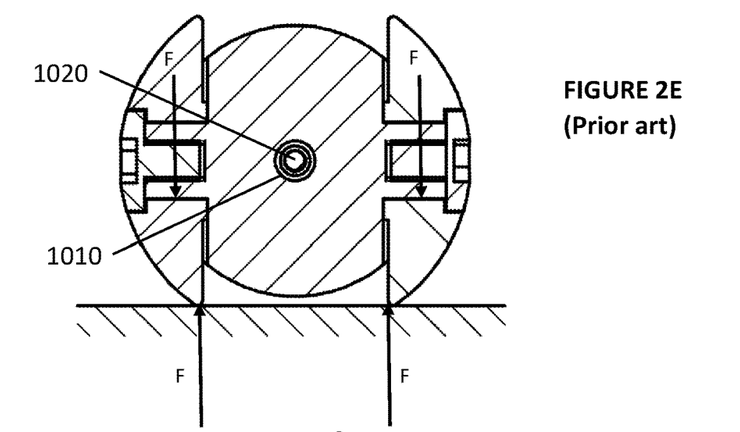
FIG. 2E is a cross sectional view on line A-A in FIG. 2C with the device on a flat surface.
Figure 2F:
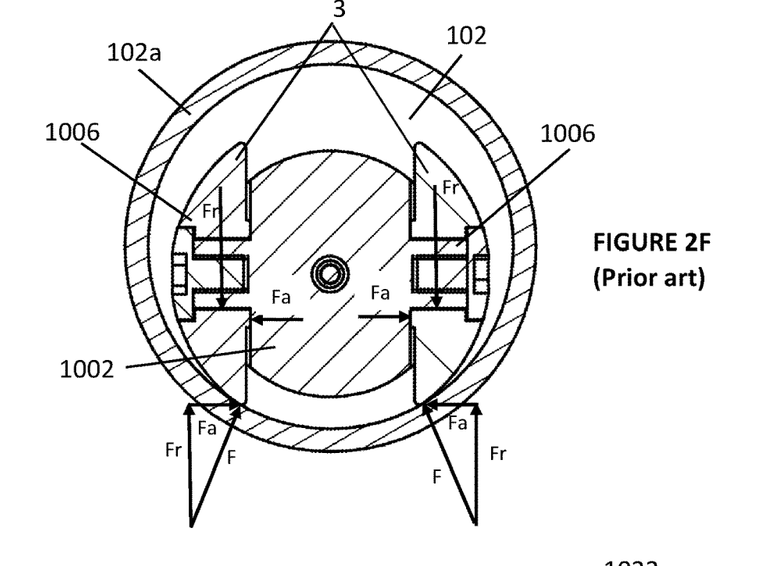
FIG. 2F is a cross sectional view on line A-A in FIG. 2C with the device in a bore.
Figure 2G:
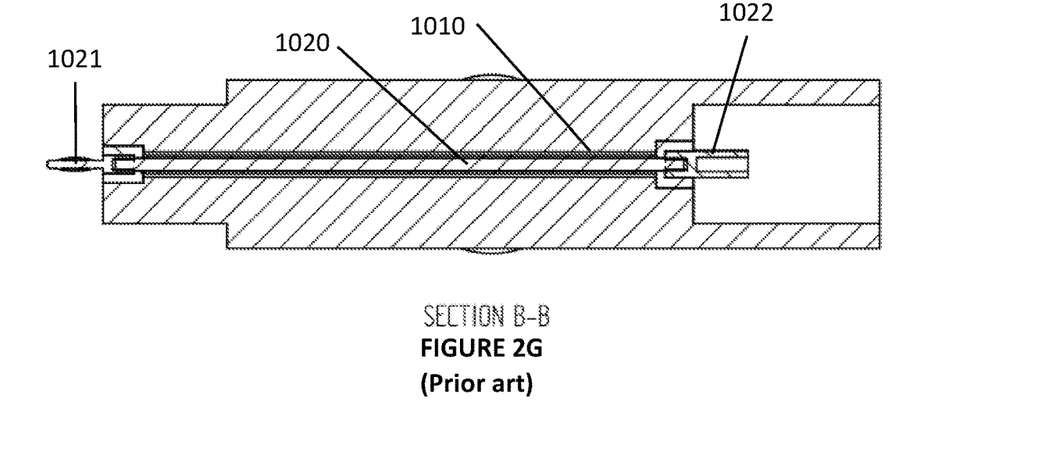
FIG. 2G is a cross sectional view on line B-B in FIG. 2D.

FIGS. 2A to 2F provide representations of a device 1001 for transporting a wireline logging tool string along a bore. The device is an in-line device, configured to be attached via a connection at each end in-line with the sensors and other tools of the tool string. FIG. 2F provides a cross section of the device 1001 within a casing 102a. A body 1002 of the device 1001 provides a pair of stub axles 1006 and corresponding wheels 3 mounted to the stub axles 1006.

The device 1001 includes an electrical conductor 1020 extending through a central conduit 1010 provided end-to-end through the body 1002 of the device 1001. An electrical connector 1021, 1022 is provided to the conductor 1020 at each end of the device to provide for power and/or signals to be transmitted through the device when connected inline in the tool string. The electrical connectors are located centrally to allow the device to be connected inline by a thread on each end of the device.

With reference to FIG. 2F, when rolling along a circular bore 102, supporting forces F act on the wheels 3 due to the weight of the tool string in a direction normal to the bore wall 102a. The normal force F results in a radial force component Fr and an axial force component Fa with respect to bearing surfaces of the wheels 3 and axles 1006. In contrast, as shown in FIG. 2E, the same device rolling on a flat surface has no axial force component. The axial force component Fa, present when rolling along a circular bore, causes thrust loads acting on the wheel bearing surfaces between the wheel and the body 1002 of the device. Thrust loads increase with reducing bore diameters, e.g. thrust loads are higher in small diameter bores. In smaller bores the wheels make contact further up the sides of the wellbore which results a larger axial force component Fa and reactive thrust load between wheel and body 1002. These high thrust loads cause high rolling friction which impedes the motion of the device and tool string down the well.

Space within the cross section of a bore is very limited, especially in small diameter casings. For example, a wheeled device for a 3" casing diameter may have a frame or body with a diameter of about 1.7 inches, providing a radial distance between the body and the casing wall of 0.65 inches leaving minimal accommodation space for the wheel and bearings for supporting rotation of the wheel. Bearings must be small to fit within the constrained space, reducing the load carrying capacity of the device.

The reference to any prior art in the specification is not, and should not be taken as, an acknowledgement or any form of suggestion that the prior art forms part of the common general knowledge in any country.

DISCLOSURE OF INVENTION

It is an object of the present invention to address any one or more of the above problems or to at least provide the industry with a useful device for conveying sensor equipment in a bore or pipe.

According to one aspect of the present invention there is provided a device for transporting a sensor assembly along a bore, the device comprising:
  a body comprising a first end and a second end, one or both of the first and second ends configured for engagement to the sensor assembly,
  a conduit extending longitudinally through the body from the first end to the second end,
  an axle extending through the body and mounted to rotate on a rotational axis perpendicular to a central longitudinal axis of the device, and
  a wheel fixed to each end of the axle,
  wherein the conduit comprises a non-linear portion extending along a non-linear path through the body to extend around the axle between the first and second ends of the body.

In some embodiments, the axle is located at a lateral centre region of the device.

In some embodiments, the rotational axis is coincident with the central longitudinal axis of the device.

In some embodiments, the conduit comprises a central portion at each of the first and second ends of the body and the non-linear portion between the central portions, the central portions are colinear with the central longitudinal axis of the device.

In some embodiments, the non-linear path laterally offsets the conduit from the central longitudinal axis of the device.

In some embodiments, the length of the axle between the wheels is longer than the width of the body between the wheels to provide a gap between an inner side of one or both wheels and a respective outer side of the body.

In some embodiments, the device comprises an electrical conductor extending through the conduit from the first end to the second end of the body, and an electrical connector mounted at each end of the body, the electrical conductor electrically connecting the electrical connectors together.

In some embodiments, the body is formed by a 3D printing process or a casting process, and the conduit or the non-linear portion of the conduit is formed in the body during the 3D printing process or the casting process.

In some embodiments, the conduit or non-linear portion of the conduit is formed without post machining of the 3D printed body or cast body.

In some embodiments, the 3D printing process comprises building up layers of material forming the body from one of the first and second ends to the other one of the first and second ends.

In some embodiments, the conduit is formed through the body by drilling a plurality of interconnecting holes In some embodiments, the non-linear portion is formed by intersecting or interconnecting holes drilled from a side of the body.

In some embodiments, the non-linear portion is formed by drilling holes from a side of the body at an angle to the central longitudinal axis of the device.

In some embodiments, the angled holes are drilled from a side of the of the body opposite to an interconnection or intersection between the two angled holes.

In some embodiments, the holes forming the non-linear portion are blanked.

In some embodiments, the holes are interconnected by a socket in a side of the body, and a cap or plug to close and seal the socket.

In some embodiments, the socket is configured to accommodate excess length of electrical conductors extending between the first and section ends the device.

In some embodiments, the wheels are fixed to the axle to rotate together with the axle.

In some embodiments, one wheel of the two wheels is integrally formed with the axle as one unitary part.

Unless the context suggests otherwise, the term "wellbore" may to refer to both cased and uncased wellbores. Thus, the term 'wellbore wall' may refer to the wall of a wellbore or the wall of a casing within a wellbore.

Unless the context suggests otherwise, the term "tool string" refers to an elongate sensor package or assembly also known in the industry as a "logging tool" and may include components other than sensors such as guide and orientation devices and centralising devices attached to sensor components or assemblies of the tool string. A tool string may include a single elongate sensor assembly, or two or more sensor assemblies connected together.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to". Where in the foregoing description, reference has been made to specific components or integers of the invention having known equivalents, then such equivalents are herein incorporated as if individually set forth.

The invention may also be said broadly to consist in the parts, elements and features referred to or indicated in the specification of the application, individually or collectively, in any or all combinations of two or more of said parts, elements or features, and where specific integers are mentioned herein which have known equivalents in the art to which the invention relates, such known equivalents are deemed to be incorporated herein as if individually set forth.

Further aspects of the invention, which should be considered in all its novel aspects, will become apparent from the following description given by way of example of possible embodiments of the invention.

BRIEF DESCRIPTION OF THE DRAWINGS

An example embodiment of the invention is now discussed with reference to the Figures.

FIGS. 2A to 2G provide representations of a device for transporting a sensor assembly along a bore. The device is provided by way of explanation only and is not an embodiment of the invention.

FIGS. 3A to 3F provide representations of a device for transporting a sensor assembly along a bore.

FIGS. 4A and 4B provide representations of another device for transporting a sensor assembly along a bore.

FIGS. 5A to 5C provide representations of another device for transporting a sensor assembly along a bore.

FIG. 6 is a representation of another device for transporting a sensor assembly along a bore.

BEST MODES FOR CARRYING OUT THE INVENTION

Alternative embodiments of the invention are described. Same or similar parts are not described for every embodiment and are referenced in the drawings by the same reference numerals.

FIG. 1 provides a schematic representation of a well site 100. A logging tool string 101 is lowered down the wellbore 102 on a wireline 103. Wellsite surface equipment includes sheave wheels 104 typically suspended from a derrick and a winch unit 105 for uncoiling and coiling the wireline to and from the wellbore, to deploy and retrieve the logging tool 101 to and from the wellbore to perform a wellbore wireline logging operation. The logging tool string 101 may include one or more logging tools each carrying one or more sensors 106 coupled together to form the logging tool string 101. The wireline 102 includes at least one wire or cable to provide electrical power to the one or more sensors 106 and/or transmit sensor data to the wellsite surface. The tool string is transported down the wellbore by devices 1.

FIGS. 3A to 3F illustrate the device 1 for transporting the tool string in the bore according to one embodiment of the invention. The device 1 comprises a body 2 for rotationally mounting wheels 3 to the tool string 101. The body 2 is configured for inline connection within a tool string via a connection 4, 5 at one or both ends of the device 1. For example, the body 2 has a thread at each end (not shown in the figures) for engaging a corresponding thread on an adjacent tool string components such as a sensor. The device 1 may have a male thread at one end 4, e.g. a first end, and a female thread at an opposite end 5, e.g. a second end. Alternatively, a male thread may be provided at each end, or a female thread at each end.

The device comprises an axle 6 extending through the body 2 of the device. The axle 6 is mounted through the body 2 to rotate on a rotational axis 7 perpendicular to a central longitudinal axis 8 of the device. The axle 6 is received in an axle bore 6A through the body 2. The axle bore 6A extends through the body orthogonal to the longitudinal axis of the device. A wheel 3 is fixed to each end of the axle 6. Each wheel is located at a respective outer side of the body of the device, thus the body is received on the axle between the wheels. Each wheel 3 may be fixed to the end of the axle 6 via a threaded fastener 9 such as a screw or bolt. The wheel may be fastened by other means to the axle or be a unitary piece with the axle. The wheels 3 may rotate together with the axle 6. No relative rotational motion may be provided between each wheel 3 and the axle 6. Thus, the axle 6 and two wheels 3 rotate together without relative rotation therebetween and act as a unitary component. The wheels have a relatively large diameter. For example, the diameter of each wheel 3 is greater than the width of the body of the device located between the wheels or the length of the portion of the axle 6 located between the wheels. The diameter of each wheel is greater than the diameter, width or height of the body and/or the tool string which the device is configured to transport.

Two or more devices 1 are mounted in-line in the tool string, so that the devices 1 carry the tool string on the wheels 3 as it descends and is ascends the wellbore.

As described with reference to FIGS. 2E and 2F, thrust loads are generated between the wheels 3 and body 1002 when rolling in a round bore due to the axial force components Fa of the normal supporting forces F applied to the wheels 3. However, in the embodiment of FIGS. 3A to 3E, the axial force component Fa due to the normal support force F is balanced by the axial force component Fa on the opposing wheel 3 since the wheels 3 are mounted to opposite ends of the axle 6 common to both wheels 3 provided through the body 2 of the device 1. The axial force Fa acting on one wheel 3 at one end of the axle 6 is equal and opposite to the axial force Fa acting on the other wheel 3 at the other end of the axle 6. The wheel and axle arrangement thus results in zero or at least significantly reduced thrust loads between the wheels and the body of the device. The body 2 essentially axially 'floats' on the axle 6, with zero or near zero axial thrust loads between the body 2 and the wheels 3. The length of the axle 6 between the wheels can be slightly longer than a maximum width of the body between the wheels 3 so that an axial gap 30 can exist between the inner side of one or both wheels 3 and an outer side of the body 2. For example, a gap 30 of around 0.5 mm between an external side of the body and each wheel may be provided. Even if the outer side of the body makes axial contact with an inner side of one wheel, the contact will be at zero or minimal axial force. This arrangement eliminates the high friction resulting from thrust loads acting between the wheel and the body.

The radial loads Fr acting on the wheels 3 are reacted by bearing surfaces between the axle 6 and the body 2 of the device 1. Plain bearings or bearing assemblies may be provided between the axle 6 and the body 2, for example ball bearing assemblies (not shown). Any known bearing arrangement may be provided.

The body 2 has a conduit 10 extending longitudinally through the body 2 from the first end 4 to the second opposite end 5 of the device 1. The conduit 10 may house an electrical conductor such as a wire or cable connected to a connector at each end of the device (not shown in FIG. 3A to 3F), as described above in relation to FIGS. 2A to 2G. The wire or cable may be a single conductor or may comprise two or more conductors connected to connectors comprising two or more contacts such as electrical sockets or pins. The conductor is preferably flexible so that it may be inserted through the body from one end of the device through to the other end of the device. The conduit 10 is sealed from the ambient environment surrounding the device. For example, a bulkhead electrical connector (e.g. 1021, 1022) with seal provided at each end of the device seals each end of the conduit to the body of the device.

Figures 3A, 3B:
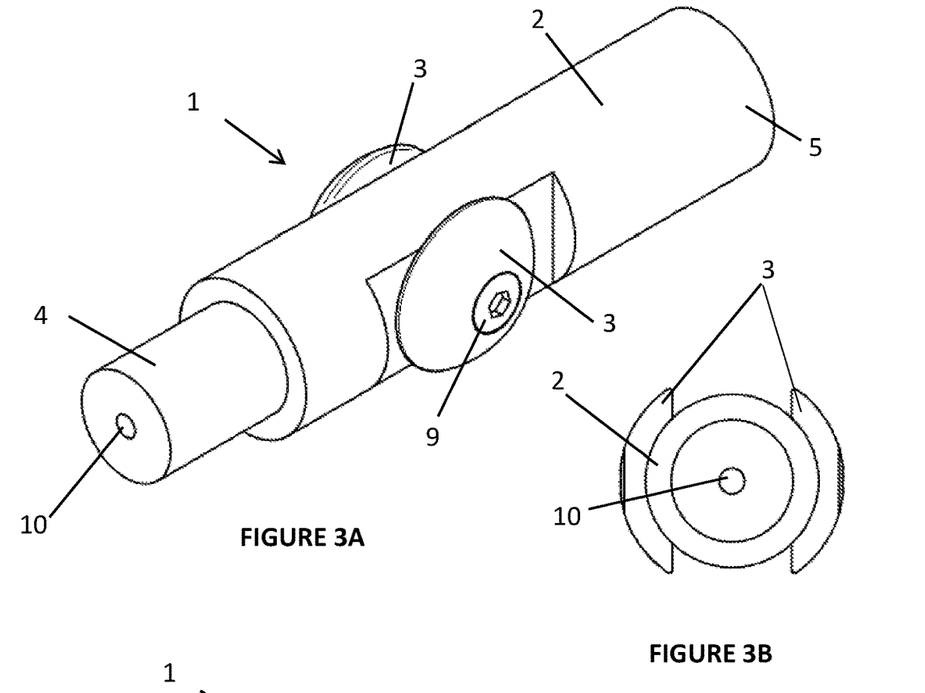
FIG. 3A is an isometric view of the device.
FIG. 3B is an end view of the device.
Figure 3C:
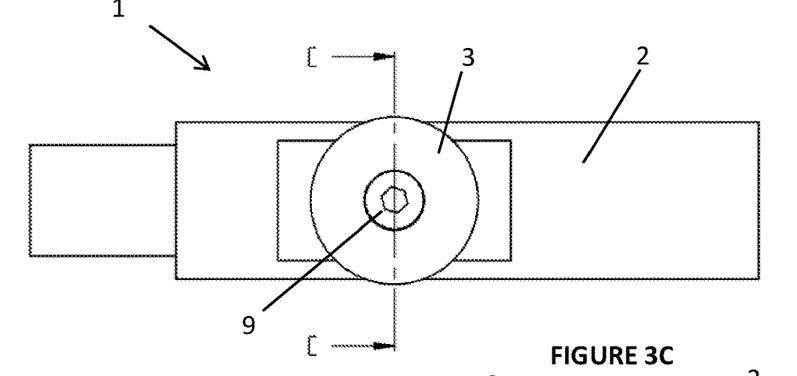
FIG. 3C is a side view of the device.
Figure 3D:
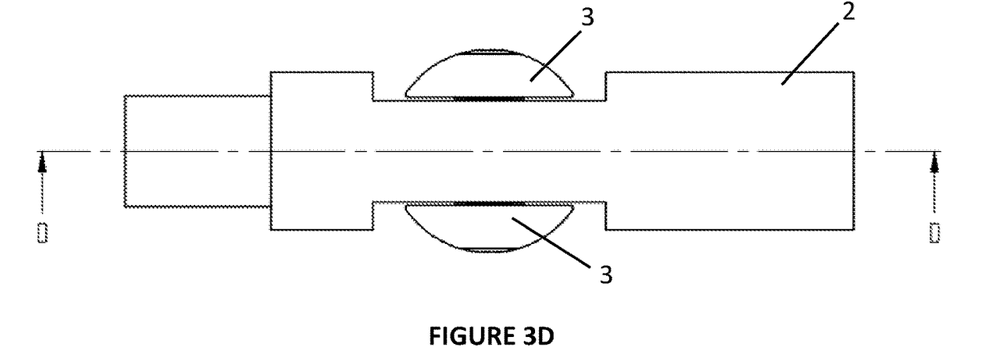
FIG. 3D is another side view orthogonal to FIG. 3C.
Figure 3E:
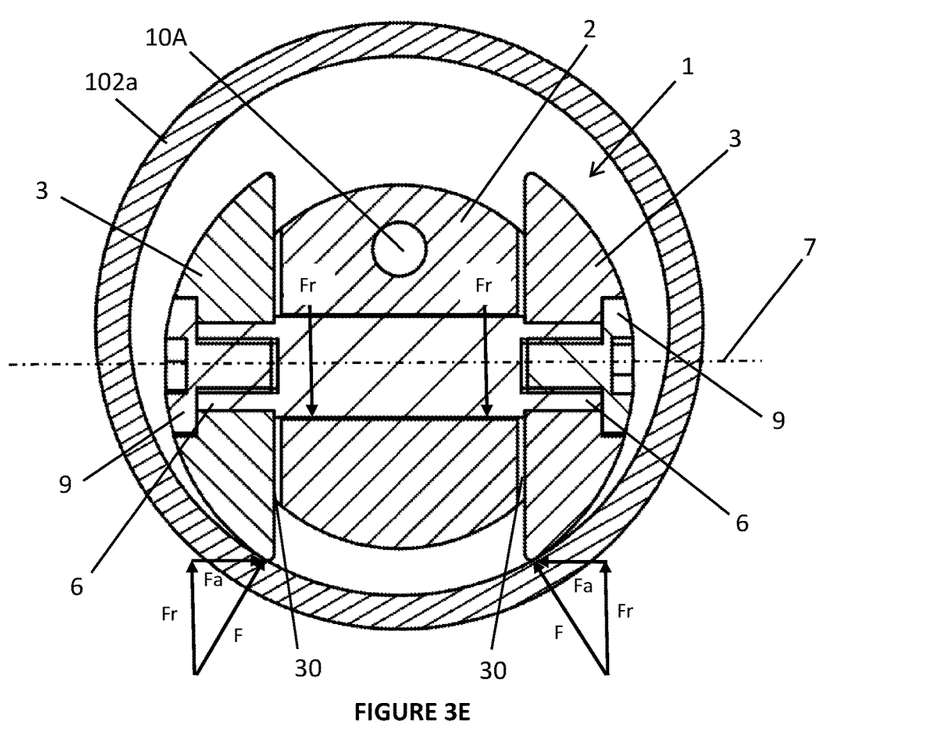
FIG. 3E is a cross sectional view on line C-C in FIG. 3C.
Figure 3F:
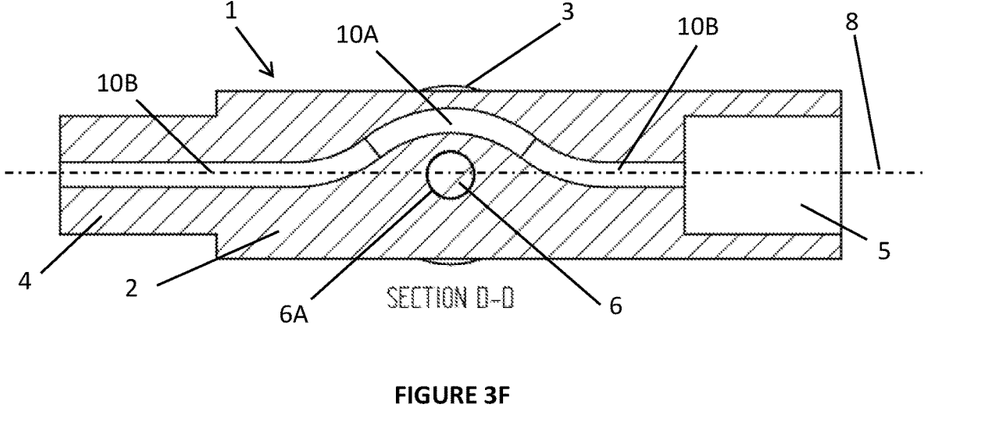
FIG. 3F is a cross sectional view on line D-D in FIG. 3D.

To accommodate both the conduit 10 and the axle 6 through the body 2 of the device, the conduit 10 has a non-linear portion 10A to extend around the axle 6 between the ends of the body 2. The non-linear portion 10A of the conduit 10 extends along a non-linear path around the axle 6 through the body. The axle 6 is received in the axle bore 6A through the body 2, and the non-linear portion 10A of the conduit 10 extends along the non-linear path around the axle bore 6A through the body 2. The phrase "extending around the axle" or "extending around the axle bore" means the non-linear portion of the conduit or non-linear path of the conduit extends circumferentially around a circumferential portion of the axle or axle bore with respect to the rotational axis of the axle/axle bore.

The conduit comprises a central portion 1013 at each end of the body 2 and the non-linear portion 10A between the central portions 1013. Each central portion 1013 of the conduit 10 is colinear with the central longitudinal axis 8 of the device, so that the conduit 10 exits each end of the device 1 on the longitudinal centerline 8 of the device 1. The non-linear path laterally offsets the non-linear portion 10A of the conduit 10 from the central longitudinal axis 8 of the device 1 to pass around the through axle 6, refer FIG. 3E compared to FIG. 2F. In the illustrated embodiment and as shown in FIG. 3E, the non-linear portion is curved with two inflection points on either side of a plane coincident with the rotational axis 7 and parallel to axial ends 4, 5 of the device 1.

The axle 6 and axle bore 6A through the body are positioned at a lateral central region of the body; e.g. at least a portion of the lateral cross section of the axle crosses the central longitudinal axis 8 of the device, Refer FIG. 3F. The non linear portion of the conduit deviates from the central longitudinal axis of the device to extend around the axle. The non-linear portion of the conduit extends laterally outside of the central region of the body. In the illustrated embodiment, the rotational axis 7 of the axle 6 is coincident with the central longitudinal axis 8 of the device. Thus, the axle 6 is located at a lateral center of the device 1. With the axle located at the center, the conduit is routed around the axle 6 to exit each end of the device on the centerline 8 of the device.

The body 2 of the embodiment of FIGS. 3A to 3F may be manufactured by a 3D printing (additive manufacturing) process. The body 2 may be 3D printed in layers of material forming the body 2. For example, additive layer manufacturing, building the body up in layers from one end of the body to the other end of the body. That is, a build direction of the body extends from one end of the device to the other end of the device. The conduit 10 or non linear portion 10A of the conduit may be formed in the body during the 3D printing process by not depositing material in the volume forming the conduit/non- linear portion of the conduit. No post machining of the 3D printed body may be required in order to form the non-linear portion of the conduit around the axle. The non-linear conduit path may also be formed in a casting process.

Figure 4A:
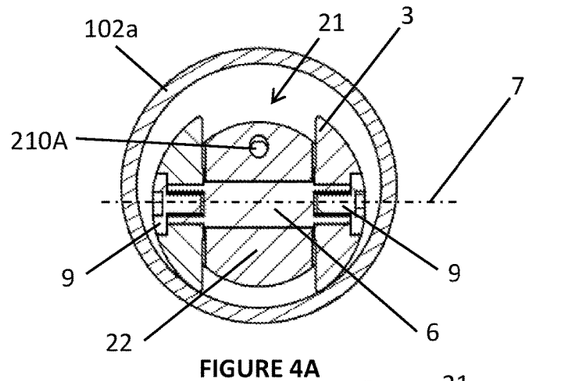
FIG. 4A is a cross sectional view in the same plane as FIG. 3E
Figure 4B:
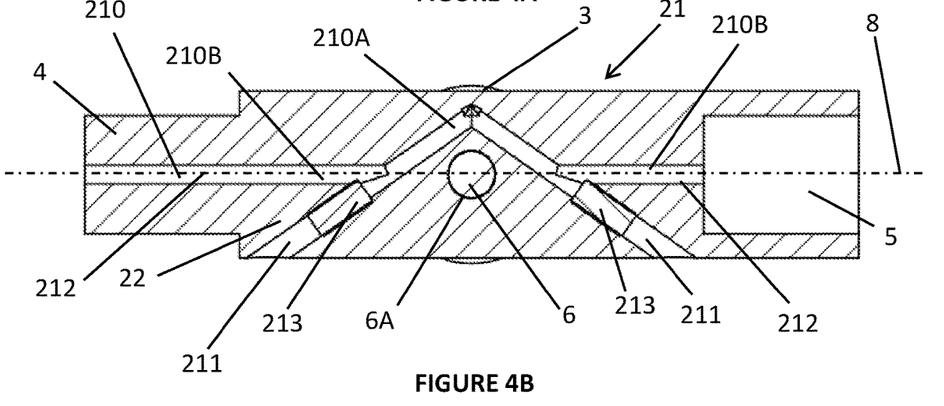
FIG. 4B is a cross sectional view in the same plane as FIG. 3F.

FIGS. 4A and 4B present cross sections of an alternative device 21 for transporting a sensor assembly in a bore. The device is the same as the device of FIGS. 3A to 3E but for the way in which the conduit is formed through the body. In the device 21 of FIGS. 4A and 4B, the conduit 210 is formed through the body 22 by drilling a plurality of interconnecting holes 211, 212. The central portions 1013 of the conduit 210 at the ends 4, 5 of the body 22 may be drilled from each end of the body 22. The non-linear portion 210A of the conduit is formed by drilling holes 211 from a side of the device 21 at an angle to the longitudinal axis 8 to intersect or interconnect holes 212 forming the central portions 10A of the conduit 10, and with the angled holes 211 intersecting or interconnecting. In the illustrated embodiment, the angled holes 211 are drilled from a side of the of the body 22 opposite to an intersection or interconnection between the two angled holes 211. Alternatively, one or both angled holes 211 may be drilled from a side of the body 22 on which the angled holes 211 intersect or interconnect. The angled holes 211 are subsequently blanked off, for example by a plug 213 inserted into an end of each angled hole 211 and/or by welding. The angled holes 211 may be blind holes subsequently blanked off.

Figure 5A:
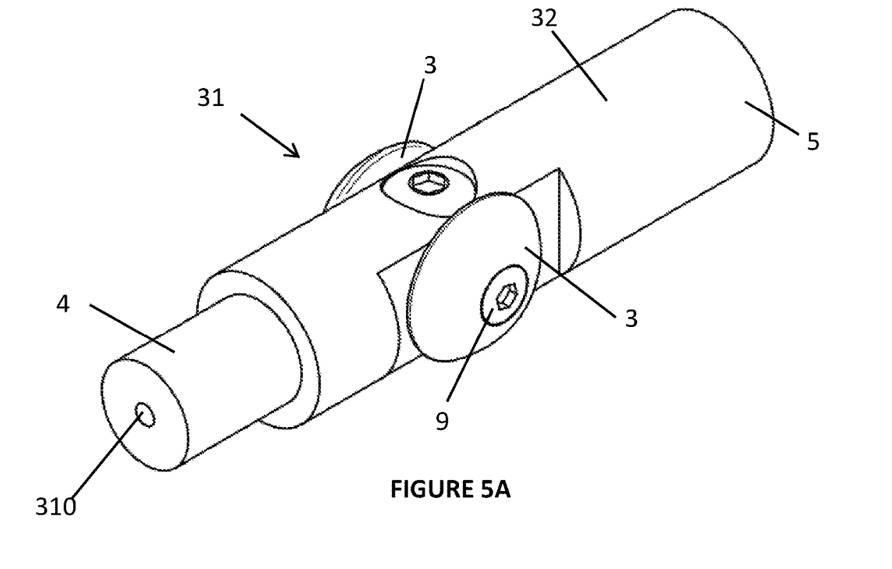
FIG. 5A is an isometric view of the device.
Figure 5B:
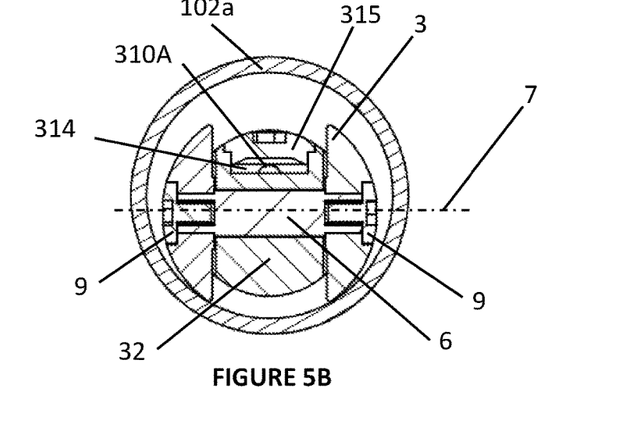
FIG. 5B is a cross sectional view in the same plane as FIG. 3E.
Figure 5C:
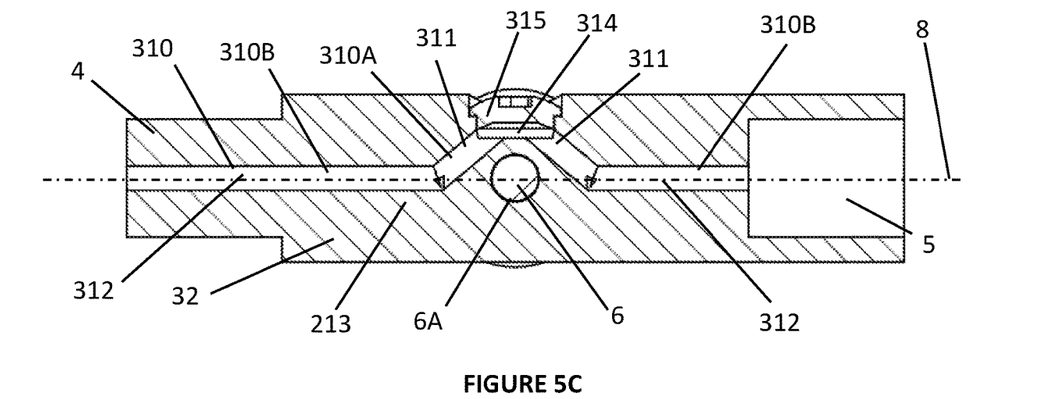
FIG. 5C is a cross sectional view in the same plane as FIG. 3F.

FIGS. 5A to 5C illustrate an alternative device 31 for transporting a sensor assembly in a bore. The device 31 is the same as the device 1 of FIGS. 3A to 3E but for the way in which the conduit is formed through the body. In the device 31 of FIGS. 5A to 5C, the conduit 310 is formed through the body 32 by drilling a plurality of interconnecting holes 311, 312, 314. The central portions 310B of the conduit 310 may be drilled from each end of the body as described above with reference to FIGS. 4A and 4B. The non-linear portion 310A of the conduit 310 is formed by drilling holes 311 from a side of the device 31 at an angle to the longitudinal axis 8 to intersect or interconnect the central portions 310B. A socket 314 may be provided in the side of the body 32 to intersect or interconnect the two angled holes 311. A cap 315 or plug is provided to the socket 314 to close and seal the socket and conduit 310 through the device. The cap or plug may be removable. A seal such as an o-ring may be provided between the plug and socket to seal the socket 314 and conduit 310 from the ambient environment. The plug 315 may be removed when routing one or more electrical conductors through the conduit, to assist with routing the conductor(s) through the non-linear portion 310A. Once the conductor(s) have been routed through the body, the plug 315 may be fitted to the socket 314 to seal the conduit 310. The plug 315 and socket 314 may be sufficiently large to provide a volume to accommodate excess length of the conductors extending between ends 4, 5 of the body 32.

Figure 6:
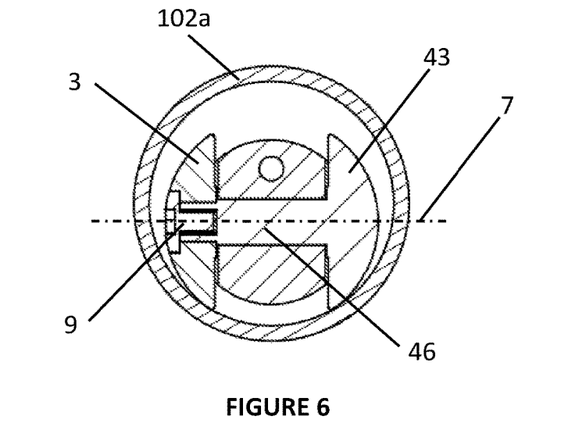
FIG. 6 is a cross sectional view in the same plane as FIG. 3E.

FIG. 6 illustrates an alternative axle 46 and wheels 3, 43 arrangement in which one wheel 43 of the two wheels 3, 43 is permanently fixed to the axle 46. For example, one wheel may be integrally formed with the axle 46 as one unitary part or may be welded to the axle. The other wheel 3 is removably fixed to the opposite end of the axle 46, for example by a fastener 9, as described in the earlier embodiment of FIGS. 3A to 3E. The wheel and axle arrangement illustrated in may be provided to any of the earlier described embodiments.

A device according to one or more aspects of the present invention as described above provides one or more of the following benefits. By mounting both wheels to a common axle, oppositely acting thrust loads are cancelled, reducing or avoiding resulting friction. Bearing friction and therefore tool string drag are reduced to a minimum. The through axle provides more space for bearing arrangements, as bearing surfaces move from between the wheel and axle where spacing is highlight constrained to between the body and the axle. Larger bearings provide for a higher load carrying capacity. Improved bearing arrangement and lower friction provides for a more reliable device and therefore lower costs.

The invention has been described with reference to a device for transporting a tool string in a wellbore during a wireline logging operation. However, a device according to the present invention may be used for conveying a sensor assembly in a bore in other applications, for example to a camera in a pipe for inspection purposes.

Although this invention has been described by way of example and with reference to possible embodiments thereof, it is to be understood that modifications or improvements may be made thereto without departing from the spirit or scope of the appended claims.

The invention claimed is:

1. A device for transporting a tool string along a wellbore, the device comprising:
   a body comprising a first end and a second end, each of the first and second ends configured for in-line connection within the tool string,
   a conduit extending longitudinally through the body from the first end to the second end,
   an axle extending through the body and mounted to rotate on a rotational axis perpendicular to a central longitudinal axis of the device, and
   a wheel fixed to each end of the axle,
   wherein the conduit comprises:
      a central portion at each of the first and second ends of the body, the central portions colinear with the central longitudinal axis of the device, and
      a non-linear portion between the central portions, the non-linear portion extending along a non-linear path through the body to extend around the axle between the first and second ends of the body.

2. The device as claimed in claim 1, wherein the axle is located at a lateral centre region of the device.

3. The device as claimed in claim 1, wherein the rotational axis is coincident with the central longitudinal axis of the device.

4. The device as claimed in claim 1, wherein the non-linear path laterally offsets the conduit from the central longitudinal axis of the device.

5. The device as claimed in claim 1, wherein the length of the axle between the wheels is longer than the width of the body between the wheels to provide a gap between an inner side of one or both wheels and a respective outer side of the body.

6. The device as claimed in claim 1, wherein the device comprises an electrical conductor extending through the conduit from the first end to the second end of the body, and an electrical connector mounted at each end of the body, the electrical conductor electrically connecting the electrical connectors together.

7. The device as claimed in claim 1, wherein the body is formed by a 3D printing process or a casting process, and the conduit or the non-linear portion of the conduit is formed in the body during the 3D printing process or the casting process.

8. The device as claimed in claim 7, wherein the conduit or non-linear portion of the conduit is formed without post machining of the 3D printed body or cast body.

9. The device as claimed in claim 7, wherein the 3D printing process comprises building up layers of material forming the body from one of the first and second ends to the other one of the first and second ends.

10. The device as claimed in claim 1, wherein the conduit is formed through the body by drilling a plurality of intersecting or interconnecting holes.

11. The device as claimed in claim 10, wherein the non-linear portion is formed by intersecting or interconnecting holes drilled from a side of the body.

12. The device as claimed in claim 11, wherein the non-linear portion is formed by drilling holes from a side of the body at an angle to the central longitudinal axis of the device.

13. The device as claimed in claim 12, wherein the angled holes are drilled from a side of the of the body opposite to an interconnection or intersection between the two angled holes.

14. The device as claimed in claim 10, wherein the holes are interconnected by a socket in a side of the body, and a cap or plug to close and seal the socket.

15. The device as claimed in claim 14, wherein the socket is configured to accommodate excess length of electrical conductors extending between the first and section ends the device.

16. The device as claimed in claim 1, wherein the wheels are fixed to the axle to rotate together with the axle.

17. The device as claimed in claim 1, wherein one wheel of the two wheels is integrally formed with the axle as one unitary part.

* * * * *

UNITED STATES PATENT AND TRADEMARK OFFICE
CERTIFICATE OF CORRECTION

| | |
|---|---|
| PATENT NO. | : 11,933,160 B1 |
| APPLICATION NO. | : 18/300752 |
| DATED | : March 19, 2024 |
| INVENTOR(S) | : Stephen Peter McCormick |

It is certified that error appears in the above-identified patent and that said Letters Patent is hereby corrected as shown below:

On the Title Page

Insert the following Item:
-- (30) Foreign Application Priority Data
Feb. 23, 2023 (NZ).............................797538 --

Signed and Sealed this
Fifth Day of November, 2024

Katherine Kelly Vidal
*Director of the United States Patent and Trademark Office*